United States Patent [19]

Sano et al.

[11] Patent Number: 4,626,694

[45] Date of Patent: Dec. 2, 1986

[54] IMAGE INTENSIFIER

[75] Inventors: Tetsu Sano; Hidero Anno, both of Tokyo; Yuichiro Kume, Kawasaki, all of Japan

[73] Assignee: Tokyo Shibaura Denki Kabushiki Kaisha, Kawasaki, Japan

[21] Appl. No.: 565,005

[22] Filed: Dec. 23, 1983

[51] Int. Cl.[4] .................... G01J 1/58

[52] U.S. Cl. .................... 250/483.1; 250/213 VT

[58] Field of Search .......... 250/483.1, 486.1, 213 VT

[56] References Cited

U.S. PATENT DOCUMENTS

| | | | |
|---|---|---|---|
| 3,330,981 | 7/1967 | Aia | 250/483.1 |
| 3,783,297 | 1/1974 | Houston | 250/213 VT |
| 3,783,298 | 1/1974 | Houston | 250/213 VT |
| 3,783,299 | 1/1974 | Houston | 250/213 VT |
| 3,825,763 | 7/1974 | Ligtenberg et al. | 250/486.1 |
| 4,011,454 | 3/1977 | Lubowski et al. | 250/483.1 |
| 4,023,039 | 5/1977 | Galves et al. | 250/213 VT |
| 4,069,355 | 1/1978 | Lubowski et al. | 250/483.1 |
| 4,371,806 | 2/1983 | Bintig et al. | 250/213 VT |
| 4,479,061 | 10/1984 | Koizumi et al. | 250/483.1 |

FOREIGN PATENT DOCUMENTS

| | | | |
|---|---|---|---|
| 57-95050 | 12/1982 | Japan | 250/213 VT |

*Primary Examiner*—Carolyn E. Fields
*Assistant Examiner*—Richard Hanig
*Attorney, Agent, or Firm*—Cushman, Darby and Cushman

[57] ABSTRACT

An image intensifier has a phosphor screen, the phosphor screen having a mesh-like substrate and a phosphor layer supported by the mesh-like substrate and to be excited by electron rays. The image intensifier provides an output image with high contrast and brightness.

17 Claims, 15 Drawing Figures

FIG. 4
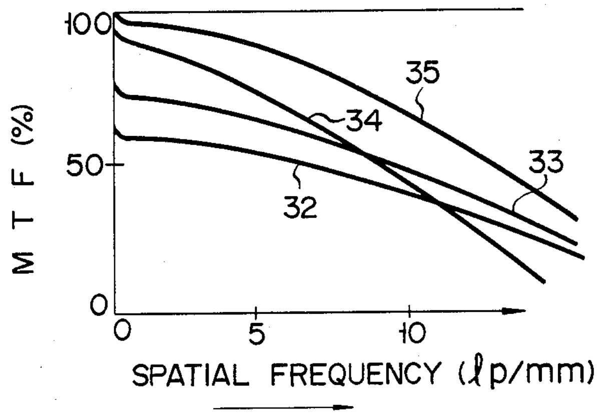
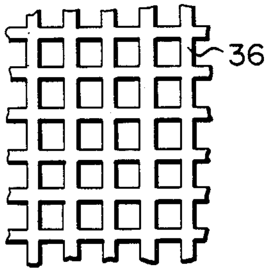
FIG. 5
FIG. 6
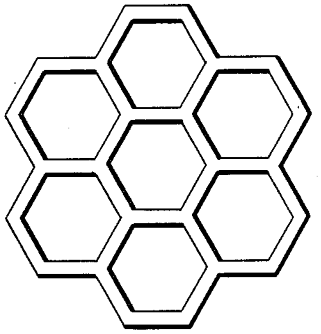
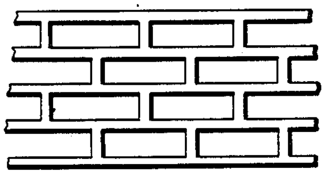
FIG. 7

IMAGE INTENSIFIER

BACKGROUND OF THE INVENTION

The present invention relates to an improvement of an output structure of an X-ray image intensifier.

The X-ray image intensifier as one of image tubes has a structure substantially as shown in FIG. 1. Referring to FIG. 1, a vacuum envelope 11 comprises an input window 12 of an X-ray transmitting material and an output window 13 of a light-transmitting material. Within the envelope 11, an input screen 14 is disposed to oppose the input window 12, and an output screen 15 is disposed to oppose the output window 13. Furthermore, a focusing electrode 16 and an anode 17 are disposed in the envelope 11. Photoelectrons emitted from the input screen 14 are focused by an electron lens formed by the focusing electrode 16 and the anode 17, so that an optical image is formed on the output screen 15. The output structure having the output window 13 and the output screen 15 is illustrated in FIG. 2. Referring to FIG. 2, a glass substrate 20 is disposed opposite to the output window 13 of glass with a small gap 19. A phosphor layer 21 is formed on a surface of the glass substrate 20 which is located not opposing the output window 13. A light-reflecting film 22 made of a material such as aluminum is formed on the surface of the phosphor layer 21.

In the output structure of the X-ray image intensifier of this type, accelerated electrons 18 are incident on the phosphor layer 21, which then emits light. For example, when the phosphor particle located at a point 23 in FIG. 2 emits light, light 24 incident at an angle smaller than the critical angle passes through the output window 13 and is guided outside. However, light 25 incident at an angle greater than the critical angle is totally reflected by the surface of the glass substrate 20 which opposes the output window 13. The totally reflected light then returns to the phosphor layer 21 and is scattered from a point 26. The point 26, which differs from the light-emitting point 23, is brightened. As a result, the contrast and resolution of the output image are degraded.

Another output structure of the image tube which improves upon the above drawback is proposed in Japanese Patent Disclosure No. 53-24770 wherein a fiber plate is used in place of the glass substrate 20. In this output structure, the spatial frequency of image is limited by a size of fibers constituting the fiber plate. Furthermore, a decrease in fiber size is physically limited. A MTF (modulation transfer function) in a high spatial frequency region is decreased, thus resulting in a disadvantage. Another output structure using an A thin film of a thickness of several microns in place of the glass substrate 20 is proposed in Japanese Patent Disclosure No. 55-165558. However, the thin A film has a low mechanical strength and cannot serve as a substrate for the phosphor layer 21 in practice. When the thickness of the Al film exceeds one micron, electron transmission is difficult to perform.

SUMMARY OF THE INVENTION

It is an object of the present invention to provide an image intensifier having a phosphor screen and capable of improving the contrast and resolution of an output image.

The image intensifier of the present invention comprises a phosphor screen having: a mesh-like substrate;

and a phosphor layer supported by the mesh-like substrate and susceptible to excitation by electron rays.

The mesh-like substrate comprises a material selected from the group consisting of: Al, Ti, Ni, Cu, Be, Co, Fe, Cr, Zr, Mo, Pd, Ag, Ta, W, Pt, C and Au; an alloy thereof; a compound thereof; a synthetic resin; and a composite material of at least two of the materials described above. The mesh number of the mesh-like substrate is preferably 400 to 12,000 mesh/inch.

BRIEF DESCRIPTION OF THE DRAWINGS

FIG. 4 is a graph showing a comparison of contrast characteristics of X-ray image intensifiers having various output phosphor screens;

FIGS. 5 to 7 are plan views showing various patterns of mesh-like substrates of output screens of the present invention.

DETAILED DESCRIPTION OF THE PREFERRED EMBODIMENT

Various examples will be described with reference to the accompanying drawings wherein the present invention is applied to an output phosphor screen of an X-ray image intensifier.

Figure 3:
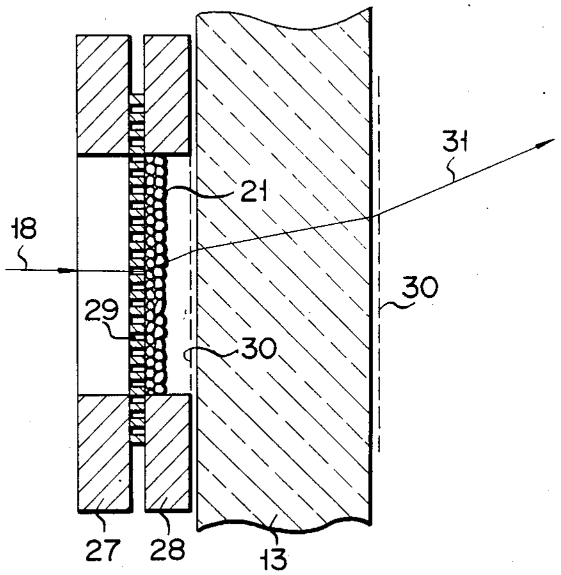
FIG. 3 is a sectional view of an output structure of an X-ray image intensifier of the present invention.

In an output structure of an X-ray image intensifier shown in FIG. 3, an output phosphor screen is disposed to oppose the inner surface of a glass output window 13 as part of a vacuum envelope. The output phosphor screen comprises: a mesh-like substrate 29 sandwiched between a pair of support rings 27 and 28; and a phosphor layer 21 formed on the surface of the mesh-like substrate 29 which opposes the output window 13. The mesh-like substrate 29 comprises a copper mesh of 400 to 4,000 mesh/inch. The mesh-like substrate 29 is kept taut by the support rings 27 and 28 at its peripheral portion. Light-reflection prevention films 30 are coated on both surfaces of the output window 13.

In the output structure as described above, accelerated electrons 18 pass through the mesh-like substrate 29 and reach the phosphor layer 21, so that the phosphor layer 21 emits light. Emitted light 31 passes through the output window 13 without total reflection and is guided outside the intensifier. Unlike the conventional output structure, the light emitted from the phosphor layer 21 will not be subjected to total reflection, and does not reach a point of the phosphor layer which differs from the light-emitting point. As a result, halation will not occur. The reflection which is inherent to the material and which occurs at both surfaces of the output window is negligibly small. Therefore, the contrast and resolution of the output image are greatly improved.

Figure 1:
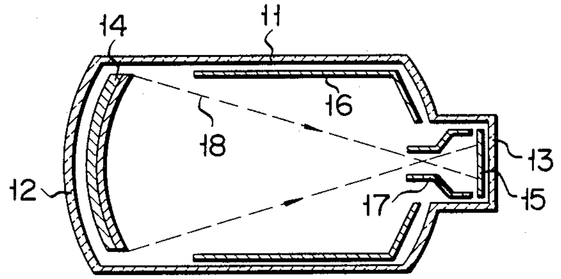
FIG. 1 (PRIOR ART)
FIG. 1 is a sectional view of a conventional X-ray image intensifier.
Figure 2:
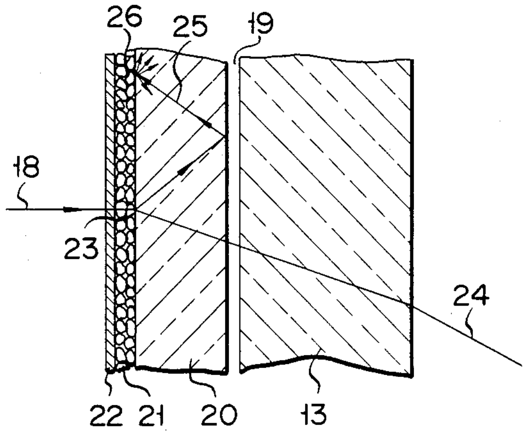
FIG. 2 (PRIOR ART)
FIG. 2 is an enlarged sectional view of an output structure of the X-ray image intensifier shown in FIG. 1.

FIG. 4 is a graph showing the contrast properties obtained by various output structures in units of MTF (%). The spatial frequency (lp/mm) is plotted along the axis of abscissa, and the MTF (%) is plotted along the axis of ordinate. Referring to the graph in FIG. 4, a curve 32 indicates the MTF (%) as a function of the spatial frequency when the conventional output structure shown in FIG. 1 is used wherein the phosphor layer is formed on a glass substrate having a 92% transmittance. A curve 33 indicates the characteristics when an output structure is used wherein a phosphor layer is formed on a light-absorbing glass substrate having a 70% transmittance. A curve 34 indicates the characteristics when an output structure is used wherein a phosphor layer is formed on a fiber plate made of optical fibers each having a size of 6 μm. A curve 35 indicates the characteristics when an output structure of the present invention shown in FIG. 3 is used. As is apparent from the graph in FIG. 4, in the structures (curves 32 and 33) using glass substrates, when the spatial frequency is low, the MTF (i.e., contrast and resolution) is low. In the structure (curve 34) using the fiber plate, since the size of the optical fiber is large, the MTF is low at a high spatial frequency. On the other hand, in the structure using the mesh-like substrate of the present invention, the MTF is sufficiently high in a wide range from a low spatial frequency to a high spatial frequency. Therefore, the contrast and resolution are found to be sufficiently high.

The mesh number of the mesh-like substrate according to the present invention is preferably 400 to 12,000 mesh/inch. When the mesh number is less than 400 mesh/inch and electron transmittance keeps its value for the mesh number 400 mesh/inch, the mesh pattern brings about a structural noise detrimental to the image. However, when the mesh number exceeds 12,000 mesh-/inch, the mechanical strength of the mesh-like substrate is degraded, and it cannot serve as the substrate. It should be noted that the mesh number can be 400 mesh-/inch when reading-recording of the output image is performed by a TV camera since the limitting spatial frequency falls within the range between 1 and 2 lp/mm.

For example, when the mesh-like substrate consists of copper, the mesh number is 2,000 mesh/inch, and the numerical aperture is about 60 to 70%, the transmittance of electrons accelerated at an acceleration voltage of 25 KeV is about 80%. In this case, the wire size of the mesh-like substrate is as small as several microns, so that image quality is not adversely affected. In this case, the mesh number must be carefully selected so as not to cause interference between the mesh pattern of the mesh-like substrate and the pattern of the scanning lines, and hence the moiré effect.

The pattern of the mesh-like substrate is not limited to the matrix form shown in FIG. 5, but may be extended to a honeycomb structure (FIG. 6) and a pattern wherein apertures adjacent to each other along the longitudinal direction are offset from each other along the transverse direction (FIG. 7).

The material of the mesh-like substrate is not limited to copper, but may be extended to any material which has a high transmittance with respect to the electrons or has a relatively high mechanical strength. Such a material includes Al, Ni, Be, Ti, Co, Fe, Cr, Zr, Mo, Pd, Ag, Ta, W, Au, or an alloy thereof. The material further includes a compound such as an oxide of one of these metals and a nitride thereof. The material may comprise a synthetic resin such as polyimide which is not easily subjected to decomposition. The material may comprise a composite material of materials enumerated above.

In order to clamp the peripheral portion of the mesh-like substrate 29 between the pair of support rings 27 and 28, the peripheral portion is first inserted between the support rings 27 and 28 and is clamped therebetween to constitute an integral unit. The resultant structure is then heated at a temperature of about 400° C. (in the case of copper mesh-like substrate) so as to recrystallize the mesh-like substrate 29, so that the mesh-like substrate 29 becomes taut between the support rings 27 and 28. Alternatively, the support rings 27 and 28 may be made of a material having a smaller thermal expansion coefficient than that of the mesh-like substrate 29. Thereafter, the support rings 27 and 28 and the mesh-like substrate 29 are bonded by thermocompression bonding or diffusion bonding, so that the mesh-like substrate becomes taut when the resultant structure is cooled to room temperature. In this case, when the mesh-like substrate 29 comprises aluminum, the support rings 27 and 28 are made of stainless steel.

A method such as electrodeposition, sedimentation, electrostatic coating, or vacuum evaporation can be used to form the phosphor layer 21 on the mesh-like substrate 29 supported by the support rings 27 and 28. In particular, when a particulate phosphor layer is formed, a silicon compound such as water glass or ethyl silicate is applied to the surface of the phosphor layer so as to increase the bonding strength between the phosphor particles. The phosphor layer 21 preferably has a thickness of 1 to 50 μm. In general, the thickness of the phosphor layer is substantially the same as that of the mesh-like substrate 29.

Figure 8:
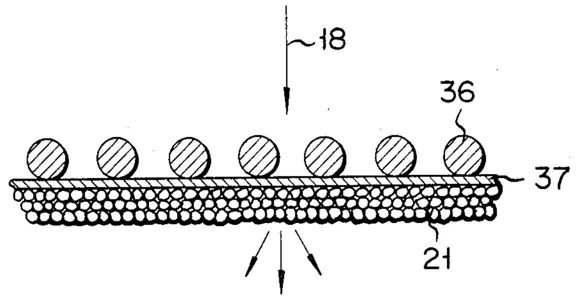
FIGS. 8 to 15 are sectional views of various output phosphor screens of the present invention.

In the output phosphor screen shown in FIG. 8, a thin metal film 37 of, for example, Al is formed on the surface of a mesh-like substrate 36, and a particulate phosphor layer 21 made of a II–VI group phosphor or a rare earth phosphor is formed on the surface of the thin metal film 37. The thin metal film 37 may be formed such that an organic film of an organic material such as nitrocellulose is formed by a floating method on the surface of a mesh-like substrate 36, a metal such as an aluminum is deposited by vacuum evaporation on the surface of the organic film, and the organic film is removed by thermal decomposition. In the output phosphor screen shown in FIG. 8, the high-speed electron rays transmitted through the mesh-like substrate 36 pass through the thin metal film 37 and reach the phosphor layer 21 so as to emit light from the phosphor layer 21. Light emitted from the phosphor is diffused through the phosphor layer 21 and emerges from the surface opposite to the incident surface of the electron rays. Therefore, unlike the conventional output phosphor screen having the thick glass substrate, total reflection does not occur in the phosphor screen of the present invention. Therefore, the MTF will not be decreased at a low spatial frequency region. A decrease in MTF at a high spatial frequency region is caused by only light diffusion at a very small amount in the phosphor layer 21. If the thin metal film 37 is formed by a light-absorbing material, light guided toward the incident side of the electron rays is absorbed by the thin metal film 37 and will not be diffused. Furthermore, if the thin metal film 37 is formed by a light-reflecting material, light guided toward the incident side of the electron rays is reflected by the thin metal film 37 and is added to light to be emitted from the output side of the electron rays through the phosphor layer 21 again, so that the summed light rays are emitted from the output side. Therefore, an output image with high brightness can be obtained. The thin metal film 37 preferably has a thickness of 1,000 to 10,000 A.

Figure 9:
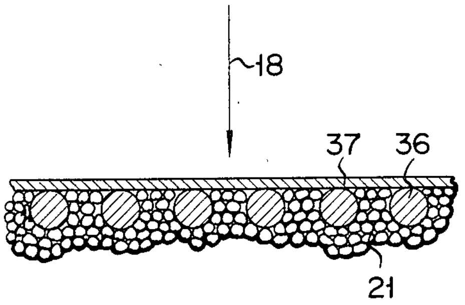
Figure 10:
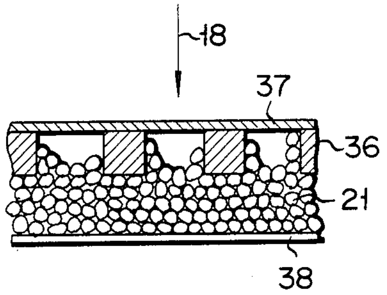

In an output phosphor screen shown in FIG. 9, a phosphor layer 21 is not formed on a thin metal film 37 but is formed such that the apertures of the mesh-like substrate 36 are embedded by the phosphor layer 21. In the output phosphor screen having the structure described above, when the surface of the mesh-like substrate 36 has a property for reflecting light of luminescent color emitted from the phosphor layer 21, light diffusion within the phosphor layer 21 can be prevented without light emission loss. Therefore, the output image can have high brightness and the MTF at a high spatial frequency region will not decrease. In a output phosphor screen shown in FIG. 10, the section of the wire of a mesh-like substrate 36 is square. Furthermore, in order to increase bonding power between the phosphor particles, a silicon compound film 38 such as a water glass film and an ethyl silicate film is formed on the surface of the phosphor layer 21. Other structural features of the output phosphor screen shown in FIG. 10 are substantially the same as those in FIG. 9.

Figure 11:
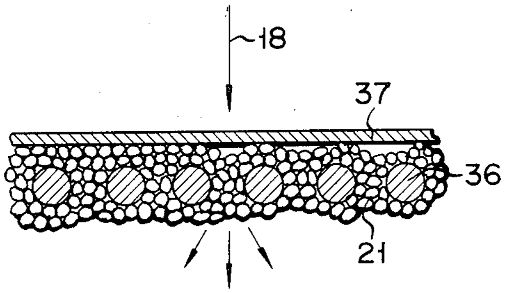

In an output phosphor screen shown in FIG. 11, a mesh-like substrate 36 is completely embedded in a phosphor layer 21. In this case, if the mesh-like substrate 36 comprises a transparent material (e.g., metal oxide or synthetic resin) with respect to light emitted from the phosphor, the pattern of the mesh-like substrate 36 is not identified as an image. Therefore, the output phosphor screen shown in FIG. 11 has the same effect as in those in FIGS. 8 to 10.

Figure 12:
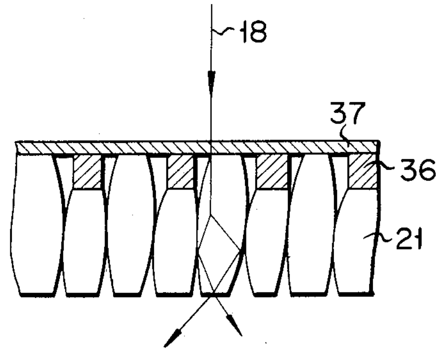

In an output phosphor screen shown in FIG. 12, a phosphor layer 21 is formed by vacuum evaporation, sputtering, ion-beam method, molecular beam epitaxy such that a transparent phosphor such as an alkali metal halide phosphor (e.g., CsI/Na) capable of columnar crystal growth is grown on a mesh-like substrate 36. Since the phosphor layer 21 grows in a columnar manner in accordance with the pattern of the mesh-like substrate 36, light emitted within the phosphor layer 21 is guided toward the output side while being subjected total reflection within the elongated crystal columns. Therefore, light diffusion in the transverse direction is small, so a decrease in MTF is small over a wide range from a low spatial frequency region to a high spatial frequency region.

Figure 13:
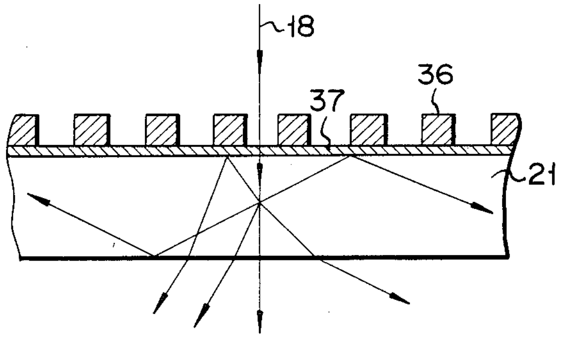

In an output phosphor screen shown in FIG. 13, a phosphor layer 21 is formed on a thin metal film 37 in the same manner as in the structure shown in FIG. 8 and is not brought into direct contact with a mesh-like substrate 36. The phosphor layer 21 is formed on the thin metal film 37 by vacuum deposition of a transparent phosphor such as a II–VI group phosphor (e.g., ZnS, ZnCdS), a rare earth phosphor (e.g., $Gd_2O_3S$, $Y_2O_3S$) and a three-element oxide phosphor (e.g., $CaWO_3$, $ZnSiO_4$). Light emitted from the phosphor layer 21 and incident on an interface between the phosphor layer 21 and the vacuum atmosphere at an angle greater than the critical angle is totally reflected without being escaped in the vacuum atmosphere. In this case, if the both surfaces of the phosphor layer 21 comprise mirror surfaces, respectively, the totally reflected light will not be emitted from the surface of the phosphor layer 21. Therefore, in spite of a large light diffusion within the phosphor layer 21, a decrease in MTF is small over a wide range from the low spatial frequency range to the high spatial frequency range.

Figure 14:
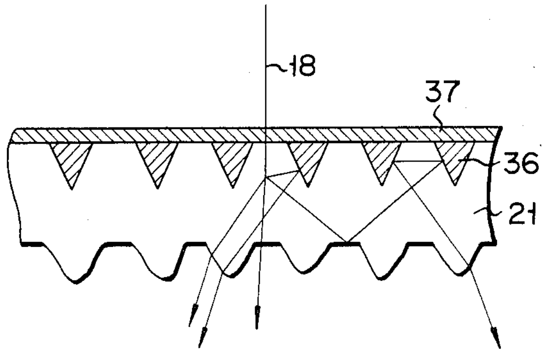
Figure 15:
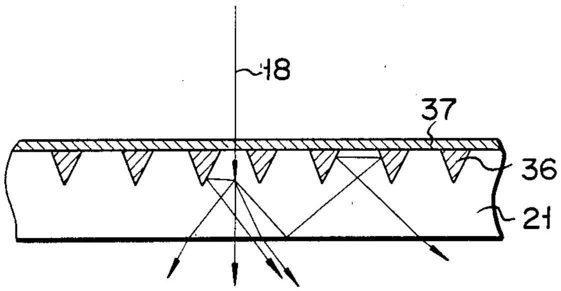

In the output phosphor screens shown in FIGS. 14 and 15, the section of the wire of each mesh-like substrate 36 has a triangular shape. A phosphor layer 21 is formed on the corresponding mesh-like substrate 36. The phosphor layer 21 (FIG. 14) is formed by vacuum deposition of a transparent phosphor in the same manner as in the phosphor layer (FIG. 13). The phosphor layer 21 (FIG. 15) is formed by vapor growth of a transparent crystal phosphor in the same manner as in the phosphor layer (FIG. 12). In these output phosphor screens, the light totally reflected by the phosphor layer 21 is scattered by the surface of the mesh-like substrate 36. As a result, an angle of incident on the surface of the phosphor layer 21 changes, so that light can be emitted in the vacuum atmosphere. As a result, an output image having higher brightness than that of the output image obtained by the output phosphor screen shown in FIG. 13 is obtained.

As described above, the present invention is applied to the output phosphor screen of the X-ray image intensifier. However, the present invention is not limited to this application, but may be extended to a variety of applications for phosphor screens of other types of image intensifiers.

As described above, in the image intensifier according to the present invention, the output phosphor screen having the mesh-like substrate is used in place of the conventional transparent substrate, so that the output image having good contrast and resolution can be obtained.

What is claimed is:

1. A screen arrangement means for an image intensifier comprising: an output screen constituted by a mesh-like substrate having an electron ray incident side and a light emitting side, and a phosphor layer supported by said light emitting side of said mesh-like substrate and susceptible to excitation by electron rays.

2. A screen arrangement means according to claim 1, wherein said mesh-like substrate comprises a member selected from the group consisting of: aluminum, titanium, nickel, copper, beryllium, cobalt, iron, chromium, zirconium, molybdenum, palladium, silver, tantalum, tungsten, platinum, carbon, and gold; an alloy or, a compound or, a synthetic resin thereof; or a composite material comprising at least two elements selected from the members.

3. A screen arrangement means according to claim 1, wherein said light emitting side of said mesh-like substrate has a metal film thereon, said phosphor layer being formed on a light emitting side of said metal film.

4. A screen arrangement means according to claim 4, wherein said metal film has a property for reflecting light emitted from a phosphor of said phosphor layer.

5. A screen arrangement means according to claim 4, wherein said metal film has a property for absorbing light emitted from a phosphor of said phosphor layer.

6. A screen arrangement means according to claim 1, wherein said phosphor layer has a surface coated with a silicon compound.

7. A screen arrangement means according to claim 1, wherein said mesh-like substrate is embedded in said phosphor layer.

8. A screen arrangement means according to claim 1, wherein said mesh-like substrate has a surface having a property for reflecting light emitted from a phosphor of said phosphor layer.

9. A screen arrangement means according to claim 1, wherein said mesh-like substrate has a surface having a property for transmitting light emitted from a phosphor of said phosphor layer.

10. A screen arrangement means according to claim 1, wherein said mesh-like substrate has a mesh number to fall within a range between 400 and 12,000 mesh-/inch.

11. A screen arrangement means according to claim 1, wherein said phosphor layer has a film thickness falling within a range between 1 and 50 $\mu$m.

12. A screen arrangement means according to claim 1, wherein said phosphor layer is formed by vacuum evaporation.

13. A screen arrangement means according to claim 1, wherein said phosphor layer is formed by vapor growth.

14. A screen arrangement means according to claim 1, wherein said phosphor layer comprises a phosphor selected from the group consisting of an alkali metal halide phosphor, a rare earth phosphor, a II–VI group element phosphor, an oxide phosphor.

15. A screen arrangement means for an image intensifier comprising: an output screen constituted by a mesh-like substrate having an electron ray incident side and a light emitting side, a phosphor layer supported by said light emitting side of said mesh-like substrate, and a metal film formed on an electron ray incident side of said phosphor layer.

16. A screen arrangement means for an image intensifier comprising an output phosphor screen having an electron ray incident surface and light emitting surface, said output phosphor screen including a mesh-like substrate, a phosphor layer supported by said mesh-like substrate, and a metal film formed on an electron ray incident side with respect to said phosphor layer, said light emitting surface of said output phosphor screen being constituted as a whole by one surface of said phosphor layer.

17. A screen arrangement means according to claim 1 wherein said phosphor layer is a transparent crystal phosphor.

* * * * *